(12) United States Patent
Tingstrom et al.

(10) Patent No.: US 10,346,628 B2
(45) Date of Patent: Jul. 9, 2019

(54) MULTI-DOMAIN APPLICATION EXECUTION MANAGEMENT

(71) Applicant: Architecture Technology Corporation, Minneapolis, MN (US)

(72) Inventors: Daniel James Tingstrom, Ithaca, NY (US); Judson Powers, Ithaca, NY (US); Matthew P. Donovan, Trumansburg, NY (US)

(73) Assignee: Architecture Technology Corporation, Minneapolis, MN (US)

( * ) Notice: Subject to any disclaimer, the term of this patent is extended or adjusted under 35 U.S.C. 154(b) by 197 days.

(21) Appl. No.: 15/164,673

(22) Filed: May 25, 2016

(65) Prior Publication Data
US 2017/0177892 A1 Jun. 22, 2017

Related U.S. Application Data

(60) Provisional application No. 62/268,368, filed on Dec. 16, 2015.

(51) Int. Cl.
*G06F 21/53* (2013.01)
*G06F 21/62* (2013.01)
*H04W 12/08* (2009.01)
*G06F 16/22* (2019.01)

(52) U.S. Cl.
CPC .......... *G06F 21/6218* (2013.01); *G06F 16/22* (2019.01); *G06F 21/53* (2013.01); *H04W 12/08* (2013.01); *G06F 2221/2113* (2013.01)

(58) Field of Classification Search
CPC ...... G06F 21/62; G06F 21/6218; G06F 21/53; H04W 12/08; H04W 4/00
See application file for complete search history.

(56) References Cited

U.S. PATENT DOCUMENTS 8,005,950 B1 * 8/2011 Ashcraft ............... G06F 9/5016
709/224
8,903,705 B2 * 12/2014 Douceur ............... G06F 9/4555
703/27

(Continued)

OTHER PUBLICATIONS

Koelsch, "Solving the Cross-Domain Conundrim", The U.S. Army War College, Mar. 2013, 36 pp.

(Continued)

*Primary Examiner* — Khang Do
(74) *Attorney, Agent, or Firm* — Shumaker & Sieffert, P.A.

(57) ABSTRACT

An example method includes selecting, based at least on first and second policies, first and second containers in which to execute first and second applications, respectively. The example method further includes isolating execution of the first application in the first container, and isolating execution of the second application in the second container. The example method also includes applying, based at least on the first policy, a first group of security controls to the first application executing in the first container, wherein the first container defines a first domain in which the first application is executed, and applying, based at least on the second policy, a second group of security controls to the second application executing in the second container, wherein the second container defines a second domain in which the second application is executed.

26 Claims, 6 Drawing Sheets

(56) References Cited

U.S. PATENT DOCUMENTS

| | | | | |
|---|---|---|---|---|
| 8,990,608 | B1* | 3/2015 | Gupta | G06F 11/2028 714/3 |
| 9,881,159 | B1* | 1/2018 | Wilson | H04L 63/0823 |
| 2004/0098289 | A1* | 5/2004 | Sugimori | H04L 41/0893 705/7.11 |
| 2013/0268676 | A1* | 10/2013 | Martins | H04L 67/10 709/226 |
| 2014/0108793 | A1* | 4/2014 | Barton | G06F 21/6218 713/165 |
| 2014/0177839 | A1* | 6/2014 | Wagner | H04L 9/0822 380/259 |
| 2015/0089575 | A1* | 3/2015 | Vepa | H04L 41/0893 726/1 |
| 2015/0142878 | A1* | 5/2015 | Hebert | H04L 67/10 709/203 |
| 2016/0191613 | A1* | 6/2016 | Srinivasan | H04L 67/10 709/201 |
| 2016/0196432 | A1* | 7/2016 | Main | G06F 8/61 726/1 |
| 2017/0005806 | A1* | 1/2017 | Brand | H04L 9/3263 |

OTHER PUBLICATIONS

Reschetova, et al., "Security of OS-level virtualization technologies", Jul. 16, 2014, 20 pp.

Assured Information Security, "SecureView—Secure Multi-Level Virtual Platform", accessed on Aug. 5, 2015, 2 pp.

Gibson, "An Architecture for Flexible Multi-Security Domain Network", United States Pacific Command, accessed on Jul. 23, 2015, 10 pp.

Scott's Weblog, "Introducing Linux Network Namespaces", retrieved from the internet http://blog.scottlowe.org/2013/09/04/introducing%ADlinux%ADnetwork%ADnamespaces/5/6, retrieved on Aug. 5, 2015, 6 pp.

Samsong Knox, "Knox Premium", retrieved from the internet https://www.samsungknox.com/en/products/knox-premium, retrieved on Aug. 5, 2015, 5 pp.

Samsong Knox, "Kox Workspace", retrieved from the internet https://www.samsungknox.com/en/products/knox-workspace, retrieved on Aug. 5, 2015, 4 pp.

Petazzoni, "Lightweight Virtualization with namespaces, cgroups, and unioning filesystems", The Eleventh Annual Southern California Linux Exp, Feb. 22-24, 2013, 2 pp.

Shinder, "Remote Access VPN and a Twist on the Dangers of Split Tunneling", retrieved from the internet http://www.isaserver.org/tutorials/2004fixipsectunnel.html, May 20, 2013, 6 pp.

McHale, "Smartphones on the battlefield", Military Embedded Systems News, retreived from the internet http://mil-embedded.com/articles/smartphones-the-battlefield/, Dec. 5, 2012, 9 pp.

Spaghetti Western, "Secure Mobility", retrived from the internet http://www.spaghetti-western.com/, retrieved on Jul. 23, 2015, 2 pp.

Wikipedia, "Split tunneling", retrieved from the Internet https://en.wikipedia.org/wiki/Split_tunneling, retrieved on Jul. 23, 2015, 2 pp.

VMware, Inc., "VMware View for Government-Agency Multilevel Secure (MLS) Desktops", retrieved from the internet https://www.vmware.com/files/pdf/view/View-for-Government-Multilevel-Secure-Desktops-wp.pdf, retrieved on Aug. 5, 2015, 12 pp.

SBIR Award Information, Phase I, "DroidChamber", Award Year: 2015, Solicitation Year: 2015, retrieved from the internet https://www.sbir.gov/sbirsearch/detail/872625, retrieved on May 25, 2016, 4 pp.

* cited by examiner

US 10,346,628 B2

MULTI-DOMAIN APPLICATION EXECUTION MANAGEMENT

This application claims the benefit of U.S. Provisional Application No. 62/268,368, filed Dec. 16, 2015, the entire content of which is incorporated herein by reference.

STATEMENT REGARDING FEDERALLY SPONORED RESEARCH OR DEVELOPMENT

This invention was made with government support under Contract No. W81XWH-15-C-0133 and Contract No. W81XWH-17-C-0009 awarded by the U.S. Army. The government had certain rights in this invention.

BACKGROUND

Today, users increasingly rely on computing devices, such as mobile computing devices, for voice communication, information access, and application usage. However, untrustworthy applications and risky online behaviors can potentially compromise the security of such computing devices. The continuing adoption of mobile computing devices in various organizations has created a growing need for technologies that enable device users to separate their data into different categories or domains, such as domains for personal and business use.

SUMMARY

In one example, a method includes selecting, by a computing system comprising one or more processors, and based at least on a first policy of a group of policies, a first container in which to execute a first application, wherein the first container is included in a group of containers that are each configured to isolate at least one application during execution within the respective container, and selecting, by the computing system, and based at least on a second policy of the group of policies, a second container in which to execute a second application, wherein the second container is included in the group of containers, wherein the second container is different from the first container, wherein the second policy is different from the first policy, and wherein the second application is different from the first application. The example method further includes isolating, by the mobile computing device, execution of the first application in the first container, isolating, by the mobile computing device, execution of the second application in the second container, and applying, by the computing system, based at least on the first policy, a first group of controls to the first application executing in the first container, wherein the first group of controls are at least configured to restrict access of the first application to a first group of resources provided by the computing system, and to control communications with the first application, wherein the first container defines a first domain in which the first application is executed. The example method further includes applying, by the computing system, based at least on the second policy, a second group of controls to the second application executing in the second container, wherein the second group of controls are at least configured to restrict access of the second application to a second group of resources provided by the computing system, and to control communications with the second application, wherein the second container defines a second domain in which the second application is executed.

In one example, a mobile computing device includes one or more processors and a computer-readable storage device communicatively coupled to the one or more processors. The computer-readable storage device stores instructions that, when executed by the one or more processors, cause the one or more processors to select, based at least on a first policy of a group of policies, a first container in which to execute a first application, wherein the first container is included in a group of containers that are each configured to isolate at least one application during execution within the respective container, and to select, based at least on a second policy of the group of policies, a second container in which to execute a second application, wherein the second container is included in the group of containers, wherein the second container is different from the first container, wherein the second policy is different from the first policy, and wherein the second application is different from the first application. The instructions further cause the one or more processors to isolate execution of the first application in the first container, to isolate execution of the second application in the second container, and to apply, based at least on the first policy, a first group of controls to the first application executing in the first container, wherein the first group of controls are at least configured to restrict access of the first application to a first group of resources provided by the mobile computing device, and to control communications with the first application, wherein the first container defines a first domain in which the first application is executed. The instructions further cause the one or more processors to apply, based at least on the second policy, a second group of controls to the second application executing in the second container, wherein the second group of controls are at least configured to restrict access of the second application to a second group of resources provided by the mobile computing device, and to control communications with the second application wherein the second container defines a second domain in which the second application is executed.

In one example, a computer-readable storage device stores instructions that, when executed, cause a mobile computing device having one or more processors to perform operations. The operations include selecting, based at least on a first policy of a group of policies, a first container in which to execute a first application, wherein the first container is included in a group of containers that are each configured to isolate at least one application during execution within the respective container, and selecting, based at least on a second policy of the group of policies, a second container in which to execute a second application, wherein the second container is included in the group of containers, wherein the second container is different from the first container, wherein the second policy is different from the first policy, and wherein the second application is different from the first application. The operations further include isolating execution of the first application in the first container, isolating execution of the second application in the second container, and applying, based at least on the first policy, a first group of controls to the first application executing in the first container, wherein the first group of controls are at least configured to restrict access of the first application to a first group of resources provided by the mobile computing device, and to control communications with the first application, wherein the first container defines a first domain in which the first application is executed. The operations further include applying, based at least on the second policy, a second group of controls to the second application executing in the second container, wherein the second group of controls are at least configured to restrict access of the second application to a second group of resources provided by the mobile computing device, and to control communications with the second application wherein the second container defines a second domain in which the second application is executed.

The details of one or more examples are set forth in the accompanying drawings and the description below. Other features, objects, and advantages of the disclosure will be apparent from the description and drawings, and from the claims.

DETAILED DESCRIPTION

As noted above, untrustworthy applications and risky online behaviors can potentially compromise the security of computing devices. To be secure and useful, a computing device may, in many cases, provide multi-level security and accessibility to secure services. Current mobile device management solutions cannot meet the needs of existing systems. The techniques of the present disclosure describe software-based systems that may enable multi-level access and/or security across different domains. These computing systems may be implemented on various types of mobile computing devices, such as smartphones and tablet computers. Using these systems, a user can, in many cases, execute applications in multiple security domains without risking information leakage, and the systems provide the appropriate isolation policies depending on the domain in use. The computing systems support a wide variety of security controls, including division of a container into areas with independent storage, configuration of flexible inter-application communication policies, and high-level application security controls that conform to domain policies, as will be described in further detail below.

In various examples, the computing systems may leverage operating system-level virtualization (OSLV) technologies (e.g., Linux kernel OSLV technologies) to isolate applications during execution and conform to selected standards (e.g., security classification standards) for isolation policies. As one example, users are able to connect applications to networks (e.g., secure networks, non-secure networks) that support different data security classifications (e.g., classified data, unclassified data), and the computing systems are operable to automatically enforce the appropriate isolation policies by providing finer-grained security controls than existing mobile device management systems. By, in many cases, providing multi-level security, the systems of the present disclosure are capable of isolating applications and data that may have different levels of sensitivity, thereby providing accessibility to services over, for example, both secure and non-secure networks, and attesting to the trustworthiness for secure networks.

In certain non-limiting examples, the computing systems described herein may create isolated security containers (e.g., Linux namespaces and/or cgroups) for mobile applications and operating system components. These systems may provide multiple containers for different security levels or different sets of security controls, and the containers may be customized for a particular set of enterprise requirements or for interaction between the containers.

Figure 1:
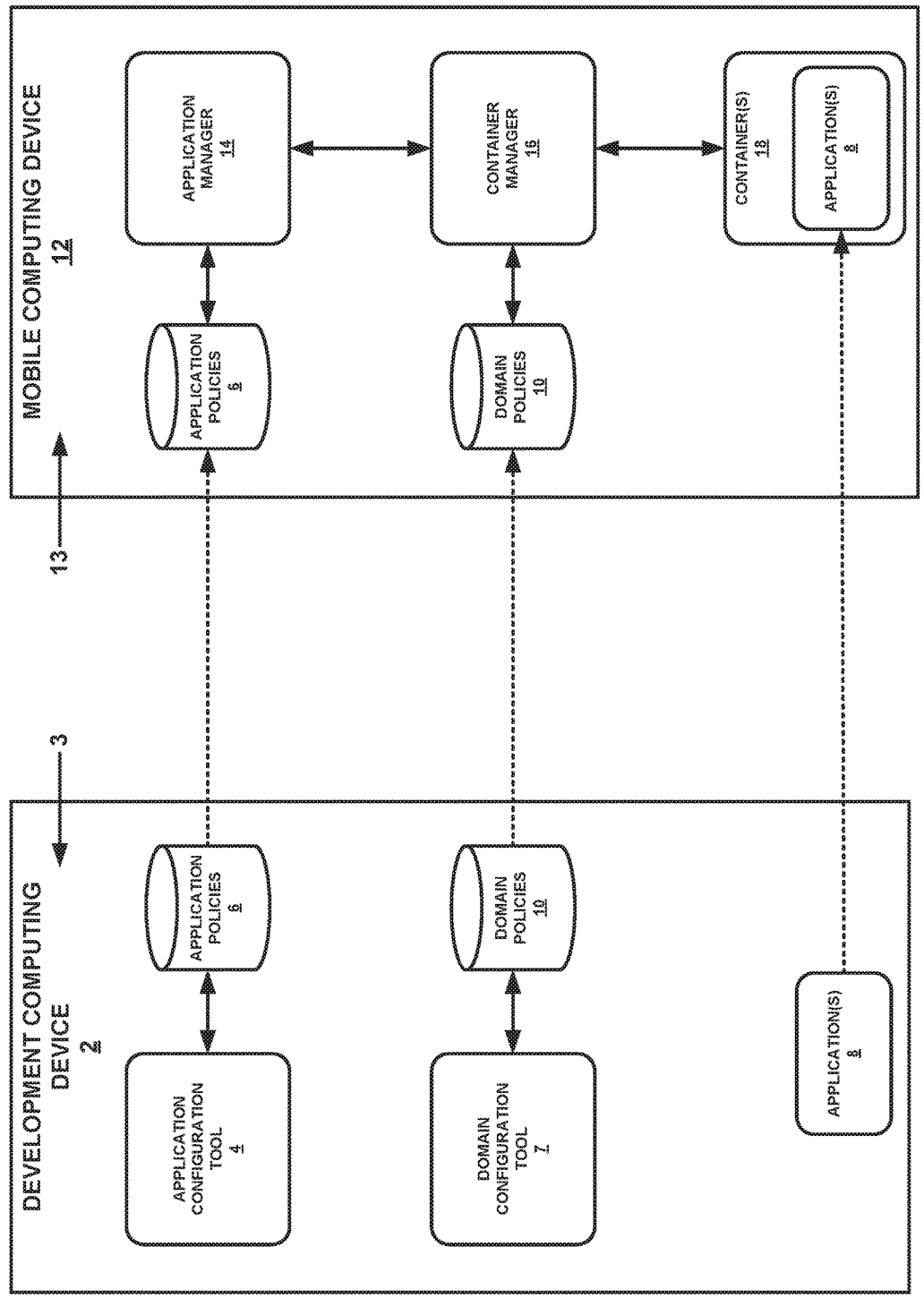
FIG. 1 is a block diagram illustrating an example development computing device and an example mobile computing device, in accordance with one or more aspects of the present disclosure.

FIG. 1 is a block diagram illustrating an example development computing device 2 and an example mobile computing device 12, in accordance with one or more aspects of the present disclosure. Development computing device 2 provides a computing system 3 that includes an application configuration tool 4, application policies 6, a domain configuration tool 7, domain policies 10, and one or more applications 8. Mobile computing device 12 provides a computing system 13 that includes application policies 6, application manager 14, domain policies 10, container manager 16, one or more containers 18, and applications 8. As will be described in more detail below, computing system 13 supports a wide variety of security controls, including division of a container into areas with independent storage, configuration of flexible inter-application communication policies, and high-level application security controls that conform to domain policies, based on domain policies 10 and/or application policies 6. Computing system 13 is configured to isolate execution of applications 8 within containers 18, as will be described in further detail below.

Application configuration tool 4 and domain configuration tool 7 of computing system 2 may, in some examples, be two interactive applications (e.g., desktop applications) that help users (e.g., administrators) create application policies 6 and domain policies 10, respectively. In some examples, application configuration tool 4 and domain configuration tool 7 may comprise graphical (e.g., desktop) applications that may be used to quickly create policies for specific needs or requirements. For instance, a user may use application configuration tool 4 to create application policies 6 via a graphical user interface, which may allow the user to create policy files (e.g., in graphical format, Extensible Markup Language format, or the like) and/or import previously created policy files (e.g., standard policy files that may be reusable across different systems or platforms) for use or modification. Thus, the user may pick and choose which one or more default policies to use, or create new policies, on a case-by-case basis. Similarly, the user may use domain configuration tool 7 to create domain policies 10.

In addition, computing system 3 may provide one or more applications 8. Applications 8 may comprise binary files that have been compiled from source code generated by any programming language and/or software development tool chain. In some cases, one or more of applications 8 may be off-the-shelf applications. In other cases, a user of development computing device 2, such as a software programmer, may create or otherwise generate source code that is compiled into one or more of applications 8. Although not shown in FIG. 1, computing system 3 may also include one or more compilers that are configured to compile such source code.

Application policies 6, domain policies 10, and applications 8 may be provided from development computing device 2 to, or otherwise installed on, mobile computing device 12, as indicated in FIG. 1. Computing system 13 of mobile computing device 12 includes application policies 6, domain policies 10, and applications 8, as well as application manager 14, container manager 16, and containers 18. Application manager 14 is configured to install, launch, and monitor applications 8 during execution, and may also be configured to monitor for domain-change requests submitted by one or more of applications 8. Application manager 14 is configured to provide an application programming interface (API) to applications 8 during execution, such that applications 8 are able to use this API to notify application manager 14 of domain-change requests, as will be described in further detail below. Applications 8 may be executed in isolation within containers 18 based upon the policies and/or other controls specified by application policies 6 and domain policies 10.

Container manager 16 is configured to deploy and maintain application isolation containers 18 and enforce the appropriate policies, such as domain policies 10, in each of containers 18. Domain policies 10 specify, among other things, how applications 8 should use resources in a particular domain. Container manager 16 may select one of containers 18 in which to execute each one of applications 8, and each container of containers 18 may define a particular domain in which an included application of applications 8 is executed, based upon domain policies 10. Some domain policies of domain policies 10 may require one application to be executed per container, while other policies may allow several applications to run in the same container. Each container may define a particular domain. Certain domain policies of domain policies 10 may restrict other resources provided by or otherwise associated with mobile computing device 12, such as network usage and file system access. Container manager 16 may apply one or more of the policies included in domain policies 10 to each container to provide a domain in which one or more of applications 8 are executed within the respective container.

In various examples, container manager 16 may use OSLV technologies to provide containers 18. In these examples, the specifications and properties of containers 18 are platform-independent. In some cases, containers 18 may be implemented on supported platforms using certain technologies or operating systems, such as jails on FreeBSD and cgroups, namespaces, LXC, an/or vServer on Linux, depending on the configuration computing system 13 on mobile computing device 12. The use of containers 18 enables applications 8, which execute inside of containers 18, to be strongly isolated with low overhead during execution.

The application of domain policies to containers 18 provides fine-grained, highly configurable control over the security parameters of applications 8 that execute within these containers 18. OSLV may use kernel features of the operating system of mobile computing device 12 to create one or more isolated, locked-down, and custom-configured containers of containers 18 for running applications 8. OSLV containers may be implemented using kernel security labels, so unlike hardware-level virtualization (e.g., typical virtual machines), there may be essentially zero cost for the OSLV containers, which may be particularly useful when implemented on mobile computing device 12. OSLV containers are highly efficient, highly flexible, and usable for providing secure isolation, and are one example of the type of containers that may be included in containers 18.

Container manager 16 may automatically create and configure containers 18 as necessary, which may include creating a new container and applying one or more policies of domain policies 10 to the new container. In some cases, rather than creating a new container, container manager 16 may select or reserve a container from a pool of reusable and/or pre-created containers. Containers 18 may be configured to limit the ability of one or more of applications 8 to access certain resources provided by or otherwise associated with mobile computing device 12.

In certain non-limiting examples, and as will be described in further detail below, container manager 16 may select, based at least on a first policy of a group of policies (e.g., domain policies 10 and/or application policies 6), a first container in which to execute a first application of applications 8, where the first container is included in containers 18 that are each configured to isolate at least one application during execution within the respective container. Container manager 16 may also select, based at least on a second policy of the group of policies, a second container in which to execute a second application of applications 8, where the second container is included in containers 18, where the second container is different from the first container, where the second policy is different from the first policy, and where the second application is different from the first application. Execution of the first application is isolated in the first container, and the first container defines a first domain in which the first application is executed. Execution of the second application is also isolated in the second container, and the second container defines a second domain in which the second application is executed.

Figure 2:
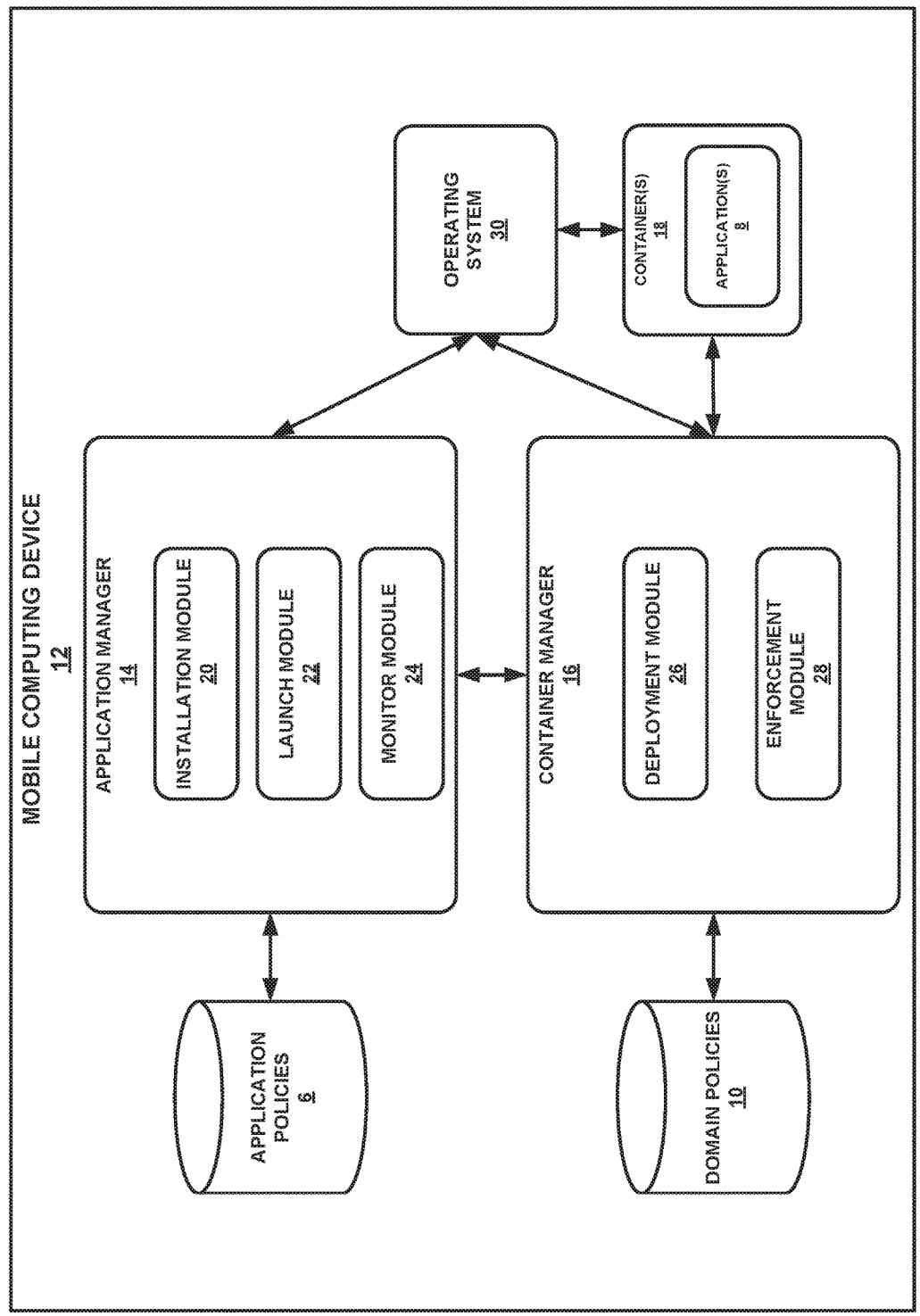
FIG. 2 is a block diagram illustrating further details of one example of the mobile computing device shown in FIG. 1, in accordance with one or more aspects of the present disclosure.

Container manager 16 applies, based at least on the first policy, a first group of controls to the first application executing in the first container, where the first group of controls are at least configured to restrict access of the first application to a first group of resources provided by mobile computing device 12 (e.g., a first group of any resources provided by mobile computing device 12, including any resources indicated in FIGS. 1, 2, and/or 5), and to control communications (e.g., inter-application communications) with the first application. Container manager 16 also applies, based at least on the second policy, a second group of controls to the second application executing in the second container, where the second group of controls are at least configured to restrict access of the second application to a second group of resources provided by mobile computing device 12, and to control communications (e.g., inter-application communications) with the second application.

In various examples, the security controls provides by containers 18 are in addition to and independent from other policies (e.g., security policies) that may be provided by the operating system (e.g., Linux) of mobile computing device 12, which may be incorporated into application policies 6 and/or domain policies 10. One or more of containers 18 may have one or more respective profiles associated with them in order to provide mandatory access control restrictions for the one or more of containers 18. These mandatory access control restrictions may include application-based controls for applications 8 that execute within containers 18. Containers 18 can also have independent filesystems, networks, inter-process communication (IPC), and user configurations. In addition, containers 18 can restrict access to devices, system calls, and other system resources of mobile computing device 12.

As the configuration of certain operating systems is file-based and the inter-application security protocols are based on process, user, and/or IPC security restrictions, containers 18 can exert extensive and fine-grained control over system configuration, shared data, and inter-application communication between applications 8, including completely isolating containers 18 from one another. There is no limit to the number of containers 18, which can be put to a variety of uses, depending on application policies 6 and domain policies 10. For example, mobile computing device 12 could implement a system with two completely isolated containers of containers 18, one for personal use and one for business use. In another example, particular (e.g., approved) applications of applications 8 could be isolated into individual containers of containers 18 in order to carefully control security-sensitive interactions of these particular applications with the rest of the system, and the remaining applications of applications 8 could be restricted to one or more low-security containers of containers 18. For example, medical data could be isolated from other types of data through the use of containers 18, even if all of the data is at the same classification level.

In many instances, container manager 16 is configured to utilize domain policies 10 and create containers that are capable of providing and maintaining physical separation between different processing domains (e.g., classified and unclassified domains), thereby partitioning mobile computing device 12 into at least different level security domains. In such fashion, techniques of the present disclosure provide multi-level security across different distinct domains defined by respective ones of containers 18 that are controlled by application policies 6 and/or domain policies 10.

The implementation of domain policies 10 and application policies 6 supports a wide variety of security controls, including division of a container into areas with independent storage, configuring flexible inter-application communication policies, and high-level application security controls that conform to domain policies 10. In addition, domain policies may provide domain-specific encryption methods for one or more of applications 8 to communicate over one or more networks to classified servers.

FIG. 2 is a block diagram illustrating further details of one example of mobile computing device 12 shown in FIG. 1, in accordance with one or more aspects of the present disclosure. As shown in FIG. 1, mobile computing device 12 includes application policies 6, domain policies 10, containers 18, and applications 8. As also shown in FIG. 2, mobile computing device 12 includes operating system 30 (e.g., FreeBSD, Linux).

Application manager 14 may include an installation module 20, a launch module 22, and a monitor module 24. Installation manager 20 is configured to install applications 8 on mobile computing device 12. Installation manager 20 may install applications 8 after, e.g., they have been provided to mobile computing device 12 or otherwise created (e.g., on development computing device 2). Installation module 20 may utilize one or more of application policies 6 for determining one or more installation parameters.

Launch module 22 is configured to launch or execute applications 8 during execution of operating system 30 on mobile computing device. Launch module 22 may utilize one or more of application policies 6 for determining one or more launch parameters. For example, application policies 6 may specify that a particular application of applications 8 is to execute in a particular domain (e.g., domain for classified data communication). Launch module 22 may execute this application and provide domain-related information, as needed, to container manager 16 so that container manager 16 is operable to isolate execution of this application within an appropriate container of containers 18.

Monitor module 24 is configured to monitor the operation of applications 8 during execution. As one example, monitor module 24 may monitor applications 8 for domain-change requests. During execution, any of applications 8 may request a domain change (e.g., to change operation from one domain to another) by sending such a request to monitor module 24 of application manager 14. The request may include an indication of the new domain (e.g., domain identifier) and, in some cases, may include an indication of the current domain in which the application is executing. Monitor module 24 may pass this indication information to container manager 16, which may correspondingly change the container in which the application is run. For example, as will be described in further detail below, each container of containers 18 may correspond with, or define, a particular domain. If a given application requests a change of domains, container manager 16 is operable to change the container in which the application is run, according to which container(s) of containers 18 is assigned to the requested domain.

Container manager 16 includes deployment module 26 and enforcement module 28. Deployment module 26 is configured to deploy containers 18 within mobile computing device 12, and enforcement module 28 enforces the appropriate domain policies of domain policies 10 in each of the respective container. Domain policies 10 may specify how application 8 should use resources in a particular domain. For example, some domain policies may require that one application of applications 8 be executed per container, while other policies may allow several of applications 8 to run in the same container. Certain domain policies of domain policies 10 may also restrict other resources, such as network usage and file-system access of mobile computing device by one or more of applications 8.

In various cases, deployment module 26 may create one or more new containers in which to execute one or more of applications 8, and include these new containers within the group of containers 18. In other cases, containers 18 include a group of pre-created containers, and deployment module 26, rather than creating new containers, selects one or more of the pre-created containers of containers 18 for executing one or more of applications 8. Containers 18 may, in certain examples, comprise one or more OSLV containers.

In the description of FIGS. 1 and 2, various references are made to application policies 6 and domain policies 10. In these figures, application policies 6 and domain policies 10 are shown as separate entities. In various examples, however, the policies of application policies 6 and domain policies 10 may be included in a single entity database), or may be included in one or more separate entities, as shown. In addition, although not shown in FIGS. 1 and 2, application manager 14 may have direct accessibility to domain policies 10 during operation, and container manager 16 may have direct accessibility to application policies 6 during operation.

Figure 3:
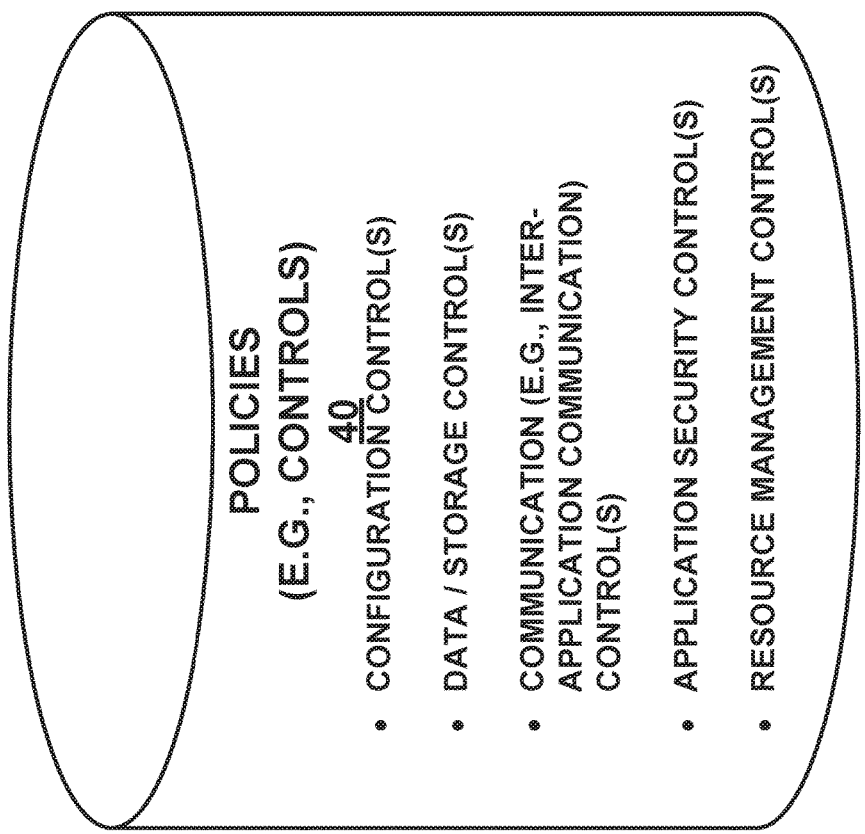
FIG. 3 is a conceptual diagram illustrating various policies, in accordance with one or more aspects of the present disclosure.

FIG. 3 is a conceptual diagram illustrating various policies (e.g., controls) 40, in accordance with one or more aspects of the present disclosure. Policies 40 are examples of one or more policies and/or controls that may be included within domain policies 10 and/or application policies 6 shown in FIGS. 1 and 2.

As shown in FIG. 3, policies 40 may include one or more configuration controls, one or more data/storage controls, one or more communication inter-application communication) controls, one or more application security controls, and one or more resource management controls. Enforcement module 28 of container manager 16, as shown in FIG. 2, may apply one or more of policies 40 to one or more of containers 18 and applications executing therein on mobile computing device, based upon the domains that are associated with or defined by each respective container. For example, policies 40 may include policy 40A that are associated with a first defined "Domain A," policy 40B that are associated with a second, different defined "Domain B," and policy 40Z that are associated with a third, different defined "Domain Z." Policy 40A may be applied to applications included in a container that is associated with or defines "Domain A," policy 40B may be applied to applications included in a container that is associated with or defines "Domain B," and policy 40Z may be applied to applications included in a container that is associated with or defines "Domain Z," as will be described in further detail in reference to FIG. 4.

Enforcement module 28 may apply one or more configuration controls to one or more of containers 18 to provide certain configurable control over certain processes and process groups for execution on mobile computing device 12. Enforcement module 28 may apply one or more data/storage controls to provide individualized areas within given containers 18 with independent storage for use by the applications whose execution is isolated within these given containers.

Enforcement module 28 may apply one or more communication (e.g., inter-application communication) controls to control the mechanisms by which applications communicate with one another, such as across different containers, within a given container, or with applications executing on external devices/systems. Inter-application security protocols may be based on process, user, and/or IPC security restrictions, in some examples. Application security controls may, in some cases, provide domain-specific encryption methods for applications 8 to communicate over a network (e.g., to classified servers).

In some examples, enforcement module 28 may apply inter-application communication controls and/or application security controls to provide a secure communication mechanism between a first application of applications 8 executing in a first container of containers 18 and a different application that is executing in the same container. In some examples, the application of these controls may provide a secure communication mechanism between different applications that are executing in different containers (e.g., cross-container communication). In addition, providing the secure communication mechanism between applications executing in one or more of containers 18 may include application of one or more security restrictions to at least one communication data flow between these communicating applications. In some examples, the application of these controls may provide a secure communication mechanism between an application and a device or system external to mobile computing device 12 (e.g., secure server, non-secure server). In such fashion, the execution of applications 8 within containers 18 may allow for the conformance to different security configuration requirements based on different standards and/or guides, according to various examples.

Enforcement module 28 may also apply one or more resource management controls to one or more of containers 18 to provide fine-grained resource management, specifying how applications 8, during execution in containers 18, utilize resources in particular, respective domains. The resource management controls may restrict access to certain resources, such as network usage and file systems, to name a few examples. These controls may also restrict access to certain devices, system calls, or other system resources, such as resources shown in FIG. 5.

Figure 4:
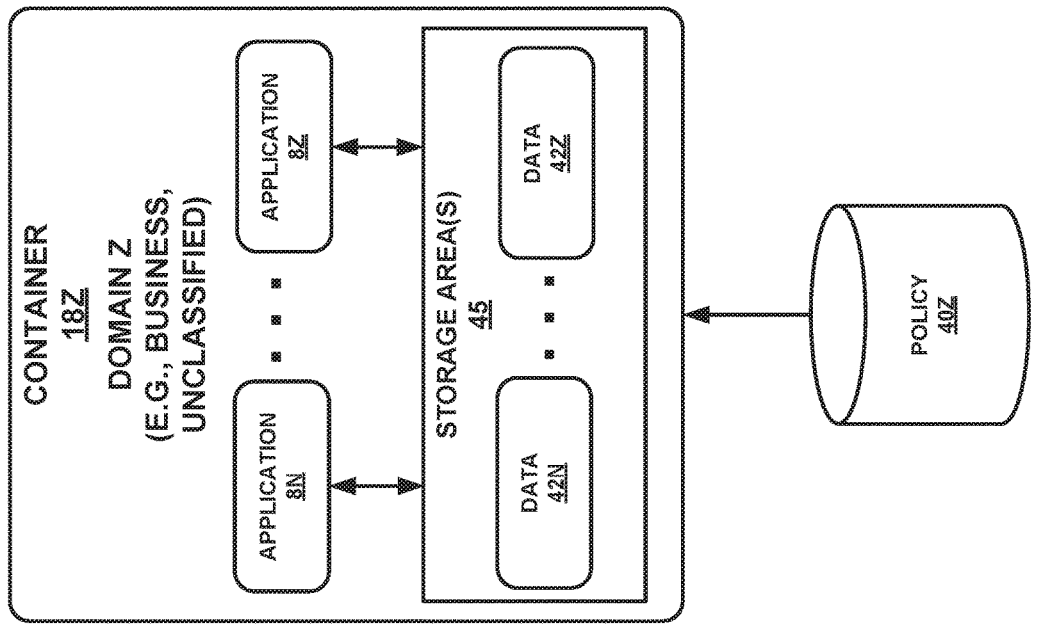
FIG. 4 is a conceptual diagram illustrating various different containers for different respective domains, in accordance with one or more aspects of the present disclosure.
Figure 4:
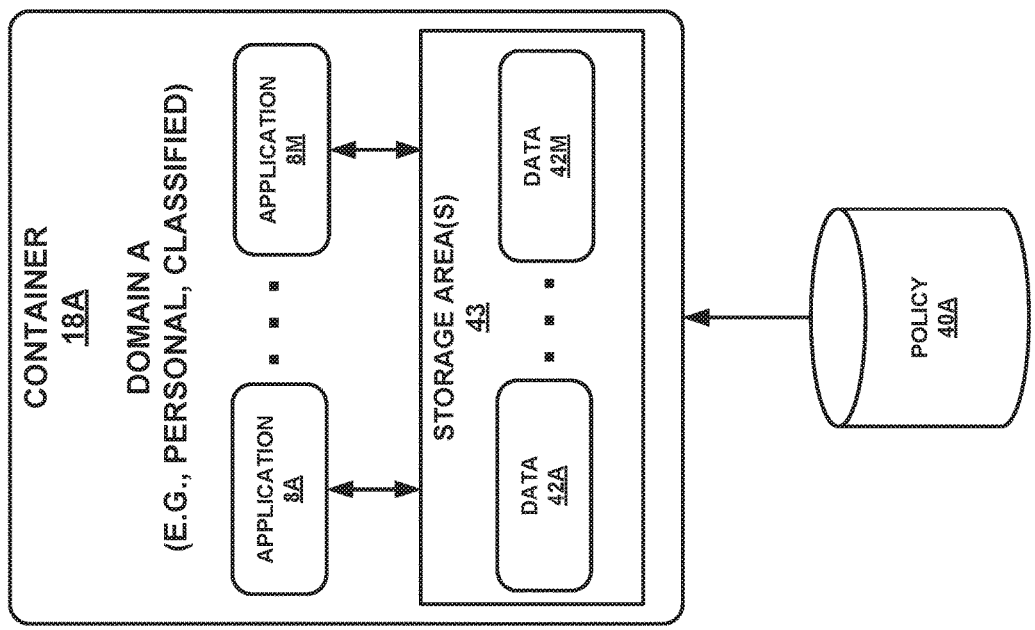

FIG. 4 is a conceptual diagram illustrating various different containers 18A-18Z that define respective domains, in accordance with one or more aspects of the present disclosure. In various examples, deployment module 26 of container manager 16 (FIG. 2) may use OSLV technologies to create secure containers 18A-18Z for isolated execution of applications 8. Containers 18A-18Z shown in FIG. 4 are examples of containers 18 shown in FIGS. 1-2.

Deployment module 26 may automatically create and configure these containers 18A-18Z as necessary, which may include creating a new container, or, in some cases, rather than creating a new container, deployment module 26 may select or reserve one or more containers from a pool of reusable and/or pre-created containers, such as containers that may have been previously used or created by deployment module 26. In some cases, containers 18A-18Z may be implemented on supported platforms using certain technologies, such as jails on FreeBSD and cgroups, LXC, and/or vServer on Linux, depending on the operating system(s) supported by mobile computing device 12.

In the example of FIG. 4, deployment module 26 has created container 18A, which defines a first domain named "Domain A," in this particular example, based on application of policy 40A by enforcement module 28. Deployment module 26 has also created container 18Z, which defines a second, different domain named "Domain Z," based on application of policy 40Z. Enforcement module 28 is configured to apply one or more controls to each of containers 18A and 18Z, and the applications respectively included in these containers, based on domain policies 10 and/or application policies 6. For example, enforcement module 28 may apply policy 40A of policies 40, illustrated in FIG. 3, to the applications executing in container 18A, and may ppliy policy 40Z of policies 40 to the applications executing in container 18Z.

As shown in the example of FIG. 4, deployment module 26 has deployed applications 8A-8M within container 18A, such that applications 8A-8M are executed in isolation within "Domain A" defined by container 18A. Deployment module 26 has also deployed applications 8N-8Z within container 18Z, such that applications 8N-8Z are executed in isolation within "Domain Z" defined by container 18Z. Deployment module 26 may determine that applications 8A-8M are executed within container 18A and that applications 8N-8Z are executed within container 18Z based, in some cases, on application policies 6 and/or information provided by application manager 14 (e.g., launch module 22 or monitor module 24). For instance, application manager 14 may specify to deployment module 26 that applications 8A-8M are to be executed within "Domain A" and that applications 8N-8Z are to be executed within "Domain Z." Deployment module 26 correspondingly deploys applications 8A-8M within container 18A, which defines "Domain A" based on policy 40A, and deploys applications 8N-8Z within container 18Z, which defines "Domain Z" based on policy 40Z.

As illustrated in FIG. 4, enforcement module 28 applies one or more controls of policy 40A to applications 8A-8M included in container 18A, as policy 40A is associated with "Domain A." Likewise, enforcement module 28 applies one or more controls of policy 40Z to applications 8N-8Z included in container 18Z, given that policy 40Z is associated with "Domain Z." Each of policy 40A and 40Z may include one or more of the controls described in reference to FIG. 3, which are respectively applied to containers 18A and 18Z.

For example, enforcement module 28 may apply one or more configuration controls of policy 40A to applications 8A-8M in container 18A to provide certain configurable control over applications 8A-8M, which may be grouped into one or more process groups. Enforcement module 28 may apply one or more data/storage controls of policy 40A to applications 8A-8M in container 18A to provide individualized storage areas 43 of container 18A, for example, with independent storage for use by the applications 8A-8M. As shown in FIG. 4, container 18A includes data 42A-42M. Data 42A-42M may be accessed by, modified, or otherwise used by one or more of applications 8A-8M during their execution, and one or more of data 42A-42M may be shared across multiple ones of applications 8A-8M. However, data 42A-42M may be stored in one or more individualized storage areas 43 within container 18A, where each such storage area is independently accessible by one or more of applications 8A-8M. Thus, although one or more of data 42A-42M may be shared by multiple ones of applications 8A-8M, certain portions of data 42A-42M may only be accessed by application 8A during execution, and certain portions of data 42A-42M may only be accessed by application 8M during execution.

For instance, enforcement module 28 may apply policy 40A to create a first independent storage area of areas 43 (e.g., area 43A, not shown) for data 42A that is only accessible and used by application 8A, and may create a second independent storage area of areas 43 (e.g., area 43M, not shown) for data 42M that is only accessible and used by application 8M. In such fashion, enforcement module 28 is able to create various different independent storage areas for data that is used only by one or more of applications 8A-8M. In some cases, multiple ones of applications 8A-8M may have accessibility to a given data storage area. Container 18Z similarly includes data 42N-42Z and one or more storage areas 45 that are accessible and used by applications 8N-8Z.

In certain examples, enforcement module 28 may apply one or more communication controls (e.g., inter-application communication controls) of policy 40A to applications 8A-8M in container 18A to control the mechanisms by which applications 8A-8M communicate with one another, to communicate with applications 8N-8Z on container 18Z, and/or to communicate with one or more devices external to mobile computing device 12 (e.g., across a network). Inter-application security protocols may, in some cases, be based on process, user, and/or IPC security restrictions, in some examples. Application security controls may provide domain-specific encryption methods for one or more applications 8A-8M to communicate over a network (e.g., to classified servers).

In some examples, enforcement module 28 may apply inter-application communication controls and/or application security controls of policy 40A to applications 8A-8M in container 18A to provide a secure communication mechanism between application 8A and application 8M within container 18A. In some examples, the application of these controls may provide a secure communication mechanism between different applications that are executing in different container, such as between application 8A in container 18A and application 8N in container 18Z. In addition, providing the secure communication mechanism between applications executing in one or more of containers 18A-18Z may include application of one or more security restrictions to at least one communication data flow between these communicating applications.

Enforcement module 28 may also apply one or more resource management controls of policy 40A to applications 8A-8M in container 18A to provide fine-grained resource management, specifying how applications 8A-8M, during execution in container 18A, utilize resources in within "Domain A" defined by container 18A. The resource management controls may restrict access to certain resources, such as network usage and file systems, to name a few examples. These controls may also restrict access to certain devices, system calls, or other system resources for applications 8A-8M executing in "Domain A" of mobile computing device 12.

In certain non-limiting examples, "Domain A" may be a first domain associated with a user's personal use/data, and "Domain Z" may be a second domain associated with the user's business use/data. Applications 8A-8Z may be executed in isolation within container 18A, which defines the domain for the user's personal use on mobile computing device 12, and data 42A-42M stored in storage areas may be accessible by one or more of applications 8A-8M. However, separate applications 8N-8Z may be executed in isolation within container 18Z, which defines the domain for the user's business use on mobile computing device 12. As a result, applications 8A-8M for the user's personal domain may be executed in complete isolation from applications 8N-8Z for the user's business domain. In addition, data 42A-42M may be completely isolated from and/or inaccessible by applications 8N-8Z executed in the user's business domain defined by container 18Z, and, similarly, data 42N-42M may be completed isolated from and/or inaccessible by applications 8A-8M executed in the user's personal domain defined by container 18A. In such fashion, a user may be able to utilize applications and associated data in two distinct, isolated domains on the same device, such as mobile computing device 12, where controls applied by policies 40A and 40Z define the scope of these domains implemented by respective containers 18A and 18Z on mobile computing device 12. Policies 40A and 40Z may allow communication between one or more of applications 8A-8M and applications 8N-8Z (e.g., inter-application and/or intra-domain communication), but applications 8A-8M and 8N-8Z are otherwise isolated for execution within their respective containers 18A and 18Z.

In certain other non-limiting examples, "Domain A" may be a first domain associated with classified use/data, and "Domain Z" may be a second domain associated with unclassified use/data. In these examples, applications 8A-8M for the classified domain may be executed in complete isolation from applications 8N-8Z for the unclassified domain. In addition, data 42A-42M may be completely isolated from and/or inaccessible by applications 8N-8Z executed in the unclassified domain defined by container 18Z, and, similarly, data 42N-42M may be completed isolated from and/or inaccessible by applications 8A-8M executed in the classified domain defined by container 18A. Policy 40A may further specify one or more controls associated with the storage of data 42A-42M within storage areas 43 in the classified domain of container 18A, thereby shielding all activity of container 18A from that of container 18Z that defines a separate, unclassified domain. In these examples, the user of containers 18A and 18Z may provide multi-level security access control within mobile computing device 12 via the implementation of the distinct classified and unclassified domains. For example, applications 8A-8M, executing within the classified domain, may be capable of interacting or otherwise communicating over secure networks with one or more devices external to mobile computing device 12 (e.g., via communication units 136 shown in FIG. 5), while applications 8N-8Z, executing within the unclassified domain, may be capable of interacting or otherwise communicating over non-secure networks.

In many cases, the use of individual, separate containers 18A and 18Z, as illustrated in FIG. 4, allows container manager 16 to carefully control security-sensitive interactions of applications 8A-8M of container 18A with the rest of the system, and the remaining applications 8N-8Z can be restricted to a different container 18Z (e.g., unclassified or lower-security container). In some cases, container 18A and container 18Z may even define different domains that are at the same classification level, but that differ in the type of data being processed. For example, container 18A may define an unclassified domain for sensitive data (e.g., medical data), while container 18Z may define an unclassified domain for non-sensitive data (e.g., non-medical and/or other data), based on the controls specified by policies 40A and 40Z, respectively.

In many instances, container manager 16 is configured to utilize domain policies 10 and create containers 18A-18Z that are capable of providing and maintaining physical separation between different processing domains (e.g., classified and unclassified domains), thereby partitioning mobile computing device 12 into at least different level security domains. In such fashion, techniques of the present disclosure provide multi-level security across different distinct domains defined by containers 18A-18Z that are controlled by policies 40A-40Z.

By providing multi-level security, the techniques of the present disclosure are capable of isolating applications and data that may have different levels of sensitivity, thereby providing accessibility to services over, for example, both secure and non-secure networks. The techniques of the present disclosure describe software-based systems that enable multi-level security that may conform to existing standards.

The number of applications executed within each container 18A and 18Z may be specified by policies 40A and 40Z. For example, policy 40A may require that any container defining "Domain A" include one and only one application for execution. In this case, container 18A may include only one application 8A for execution. If another application, such as application 8B, is to be executed within "Domain A" (e.g., as specified by application policies 6), deployment module 26 of container manager 16 may utilize a separate container, such as container 18B, for executing application 8B, where container 18B also defines "Domain A." In this case, both containers 18A and 18B define and provide controls for "Domain A," but each executes only one respective application. In addition, as policy 40A is associated with the controls for "Domain A," policy 40A is applied to application 8A in container 18A and also to application 8B in container 18B. Policy 40A may be applied to all containers, and applications included respectively therein, that define "Domain A."

In other cases, policy 40A may allow any container defining "Domain A" to include more than one application for execution. In these cases, such as illustrated in FIG. 4, container 18A, which defines "Domain A," may include two or more applications, such as applications 8A-8M, for execution within container 18A. In these cases, policy 40A may be applied to each of applications 8A-8M in container 18A for "Domain A."

During execution, any of applications 8A-8M or 8N-8Z may, in certain cases, request a domain change (e.g., to change operation from one domain to another) by sending such a request to monitor module 24 of application manager 14. The request may include an indication of the new domain (e.g., domain identifier) and, in some cases, may include an indication of the current domain in which the application is executing. Monitor module 24 may pass this indication information to container manager 16, which may correspondingly change the container in which the application is run (e.g., using deployment module 26), and also apply updated policies to the application.

For example, at a certain point during execution, application 8A may send monitor module 24 a request to change domains from "Domain A" to "Domain Z." Monitor module 24 may first determine whether such a request may or may not be granted. For example, application policies 6 may, in general, prohibit such changes, or may specifically prohibit any changes from "Domain A" to "Domain Z." However, assuming that such a domain change is acceptable, monitor module 24 may pass the request to deployment module 26, and deployment module 26 may correspondingly move application 8A from container 18A and into container 18Z, which defines "Domain Z," assuming that policy 40Z allows container 18Z for "Domain Z" to include multiple applications. (If not, deployment module 26 may use a new container and move application 8A into this new container, applying policy 40Z to such new container to apply the controls of "Domain Z.") However, any data in storage areas 43 previously used by application 8A may, in some cases, only be moved into container 18Z if policy 40A and/or policy 40Z allow for such data propagation, based upon the controls applicable to "Domain A" and "Domain Z." Enforcement module 28 may remove the association of application 8A with policy 40A of "Domain A," and may instead apply policy 40Z to application 8A in container 18Z, which defines the scope of "Domain Z."

In various examples, the techniques of the present disclosure support the processing and transmission of multi-domain data (e.g., classified and unclassified). Container manager 16 is able to apply domain-specific policies (e.g., policies 40A, 40Z) that enforce the appropriate processing and transmission for a particular domain defined by a particular container. The techniques leverage, in many examples, OSLV technologies for isolating execution of applications 8A-8M and 8N-8Z in containers 18A and 18Z, respectively.

The implementation of containers 18A-18Z helps maintain physical separation between different domains "Domain A" and "Domain Z," such as domains of different security levels (e.g., classified/unclassified domains). Container manager 16 is capable of isolating application resources (e.g., networking) based on specific policies (e.g., policies 40A, 40Z), which can include pre-defined policies that may conform to one or more standards (e.g., federal agency standards), but can also include customized policies created by users using domain configuration tool 7 and/or application configuration tool 4.

Figure 5:
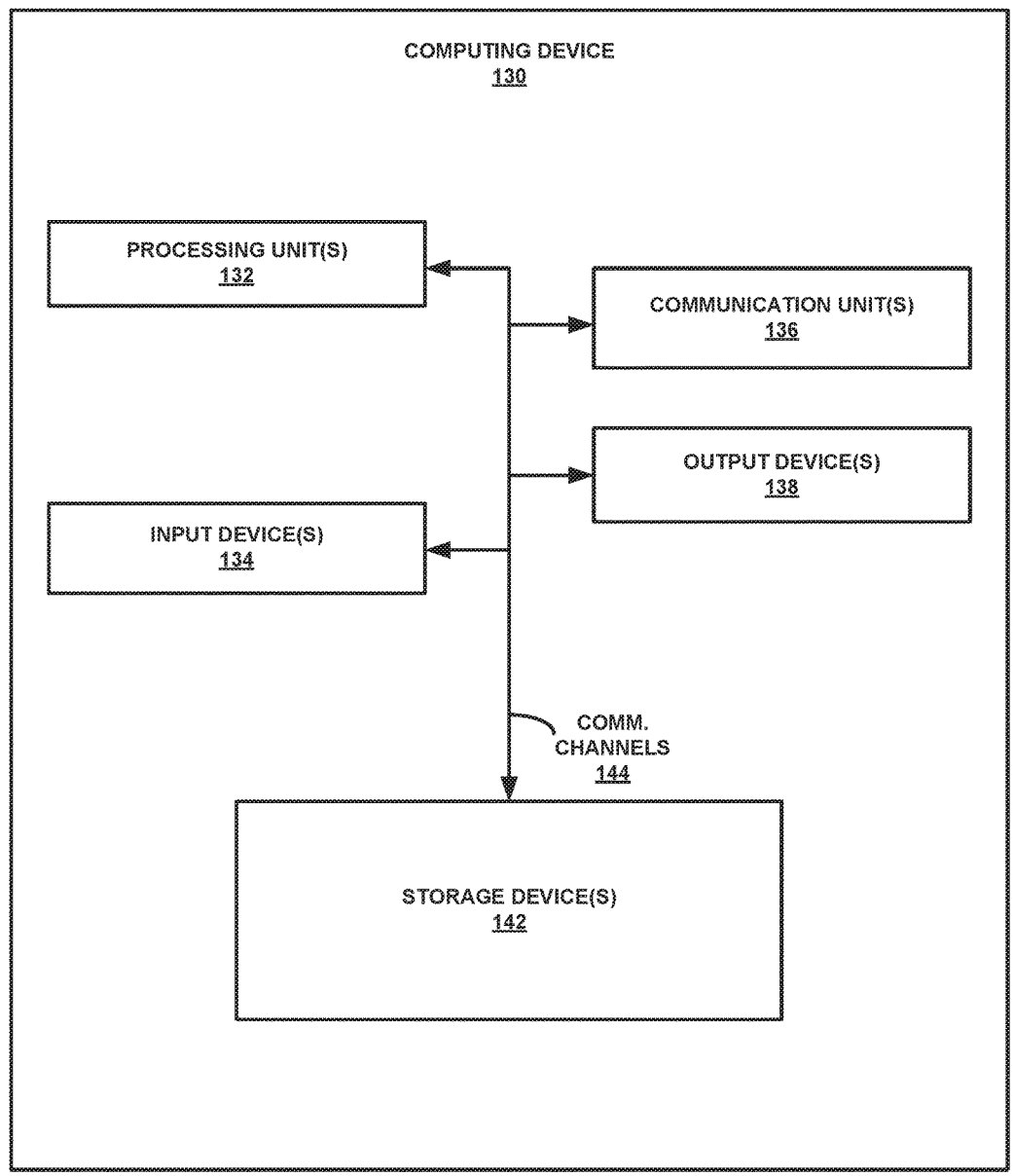
FIG. 5 is a block diagram illustrating further details of an example computing device, in accordance with one or more aspects of the present disclosure.

FIG. 5 is a block diagram illustrating further details of an example computing device 130, such as mobile computing device 12 or development computing device 2 shown in FIG. 1, in accordance with one or more aspects of the present disclosure. FIG. 5 illustrates only one particular example of computing device 130, and many other examples of computing device 130 may be used in other instances and may include a subset of the components shown, or may include additional components not shown, in FIG. 5.

As shown in the example of FIG. 5B, computing device 130 includes one or more processing units 132, one or more input devices 134, one or more communication units 136, one or more output devices 138, and one or more storage devices 142. Communication channels 144 may interconnect each of the components 132, 134, 136, 138, and 142 for inter-component communications (physically, communicatively, and/or operatively). In some examples, communication channels 144 may include a system bus, a network connection, an inter-process communication data structure, or any other method for communicating data between hardware and/or software.

One or more input devices 134 of computing device 130 may receive input. Examples of input are tactile, audio, and video input. Examples of input devices 134 include a presence-sensitive screen, touch-sensitive screen, mouse, keyboard, voice responsive system, video camera, microphone or any other type of device for detecting input from a human or machine.

One or more output devices 138 of computing device 130 may generate output. Examples of output are tactile, audio, and video output. Examples of output devices 138 include a presence-sensitive screen, sound card, video graphics adapter card, speaker, cathode ray tube (CRT) monitor, liquid crystal display (LCD), or any other type of device for generating output to a human or machine. Output devices 138 may include display devices such as cathode ray tube (CRT) monitor, liquid crystal display (LCD), or any other type of device for generating tactile, audio, and/or visual output.

One or more communication units 136 of computing device 130 may communicate with one or more other computing systems or devices via one or more networks by transmitting and/or receiving network signals on the one or more networks. Examples of communication unit 136 include a network interface card (e.g. such as an Ethernet card), an optical transceiver, a radio frequency transceiver, or any other type of device that can send and/or receive information, such as through a wired or wireless network. Other examples of communication units 136 may include short wave radios, cellular data radios, wireless Ethernet network radios, as well as universal serial bus (USB) controllers. Communication units 136 may provide wired and/or wireless communication.

One or more storage devices 142 within computing device 130 may store information for processing during operation of computing device 130 (e.g., computing device 130 may store data accessed by one or more modules, processes, applications, or the like during execution at computing device 130). In some examples, storage devices 142 on computing device 130 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage devices 142, in some examples, also include one or more computer-readable storage media. Storage devices 142 may be configured to store larger amounts of information than volatile memory. Storage devices 142 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 142 may store program instructions and/or data associated with one or more software/firmware elements or modules.

For example, when computing device 130 comprises an example of development computing device 2 shown in FIG. 1, storage devices 142 may store application policies 6 and domain policies 10, including policies 40 (FIG. 3). In addition, storage devices 142 may store instructions and/or data associated with application configuration tool 4, domain configuration tool 7, and applications 8.

In other examples, when computing device 130 comprises an example of mobile computing device 12 shown in FIGS. 1 and 2, storage devices 142 may store application policies 6 and domain policies 10, including policies 40. Storage devices 142 may also store instructions and/or data associated with application manager 14, container manager 16, containers 18, and applications 8. Storage devices 142 may store instructions and/or data associated with installation module 20, launch module 22, and monitor module 24 of application manager 14, and may also store instructions and/or data associated with deployment module 26 and enforcement module 28 and container manager 16.

Storage devices 142 also store instructions and/or data associated with an operating system (e.g., operating system 30, shown in FIG. 2), which may be used by computing device 130 during operation. As described herein, computing device 130 may utilize one or more different operating systems (e.g., FreeBSD, Linux).

Computing device 130 further includes one or more processing units 132 that may implement functionality and/or execute instructions within computing device 130. For example, processing units 132 may receive and execute instructions stored by storage devices 142 that execute the functionality of the elements and/or modules described herein. These instructions executed by processing units 132 may cause computing device 130 to store information within storage devices 142 during program execution. Processing units 132 may also execute instructions of the operating system to perform one or more operations described herein.

Figure 6:
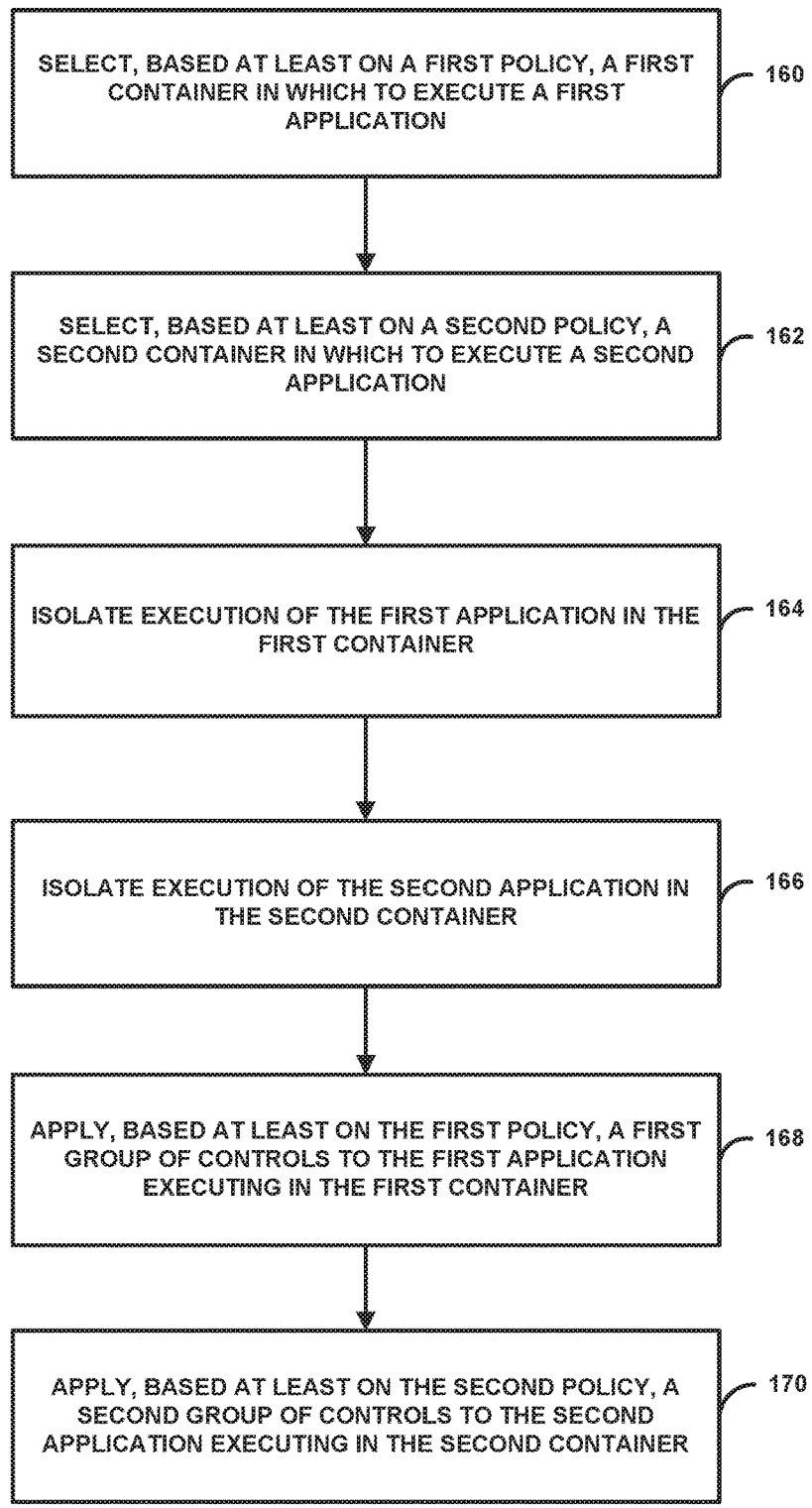
FIG. 6 is a flow diagram illustrating an example process that may be performed by a computing device, such as the mobile computing device shown in FIGS. 1-2, in accordance with one or more aspects of the present disclosure.

FIG. 6 is a flow diagram illustrating an example process that may be performed by a computing device, in accordance with one or more aspects of the present disclosure. For example, the process illustrated in FIG. 6, which may comprise one or more operations, may be performed by one or more of the computing devices shown in FIGS. 1, 2, and 5. For purposes of illustration only, it will be assumed that the process of FIG. 6 is performed by mobile computing device 12.

As illustrated in the example process of FIG. 6, mobile computing device 12 may select (e.g., using deployment module 26 of container manager 16), based at least on a first policy of a group of policies (e.g., policies 40), a first container in which to execute a first application (e.g., application of applications 8), wherein the first container is included in a group of containers (e.g., containers 18) that are each configured to isolate at least one application during execution within the respective container (160). Mobile computing device 12 may also select, based at least on a second policy of the group of policies, a second container in which to execute a second application, wherein the second container is included in the group of containers, wherein the second container is different from the first container, wherein the second policy is different from the first policy, and wherein the second application is different from the first application (162). Mobile computing device 12 is configured to isolate execution of the first application in the first container (164), and to isolate execution of the second application in the second container (166).

Mobile computing device 12 applies (e.g., using enforcement module 28 of container manager 16), based at least on the first policy, a first group of controls to the first application executing in the first container, wherein the first group of controls are at least configured to restrict access of the first application to a first group of resources provided by the computing system, and to control communications (e.g., inter-application communications) with the first application, wherein the first container defines a first domain in which the first application is executed (168). Mobile computing device 12 also applies, based at least on the second policy, a second group of controls to the second application executing in the second container, wherein the second group of controls are at least configured to restrict access of the second application to a second group of resources provided by the computing system, and to control communications (e.g., inter-application communications) with the second application, wherein the second container defines a second domain in which the second application is executed (170).

In some examples, the first container comprises a first OSLV container, and wherein the second container comprises a second OSLV container. Selecting the first container may include creating a first new container in the group of containers, and selecting the second container may include creating a second new container in the group of containers.

In some examples, the group of containers includes a group of pre-created containers provided by the mobile computing device. Selecting the first container may include selecting a first pre-created container from the group of pre-created containers, and selecting the second container may include selecting a second pre-created container from the group of pre-created containers.

In some examples, the second group of resources shares at least one common resource with the first group of resources. Applying the first group of security controls to the first application executing in the first container to control communications with the first communication may include providing a secure communication mechanism between the first application executing in the first container and another application executing in the first container. Applying the first group of security controls to the first application executing in the first container to control communications with the first communication may include providing a secure communication mechanism between the first application executing in the first container and the second application executing in the second container. Providing the secure communication mechanism between the first application and the second container may include applying one or more security restrictions to at least one communication data flow between the first application and the second application.

In some cases, the first group of controls of the first policy further includes one or more of configuration controls to control configuration of the first container, storage controls to control storage of data within the first container, or application security controls for the first container. The first group of controls may be further configured to provide, in the first container, a first independent storage area to store data that is only accessible to the first application, and the second group of controls are further configured to provide, in the second container, a second independent storage area to store data that is only accessible to the second application.

In some examples, the operations further include selecting, by the mobile computing device and based at least on the first policy, the first container in which to execute a third application, isolating, by the mobile computing device, execution of the third application in the first container, and applying, by the mobile computing device, and based at least on the first policy, the first group of controls to the third application executing in the first container, wherein the first container defines the first domain in which the third application is executed.

In some other examples, the operations further include selecting, by the mobile computing device and based at least on the first policy, a third container in which to execute a third application, wherein the third container is included in the group of containers, and wherein the third container is different from each of the first container and the second container. The operations may further include isolating, by the mobile computing device, execution of the third application in the third container, and applying, by the mobile computing device, and based at least on the first policy, the first group of controls to the third application executing in the third container, wherein the third container also defines the first domain in which the third application is executed.

In certain examples, the operations also include selecting, by the mobile computing device, and based upon a domain change request, the second container in which to execute the first application, isolating, by the mobile computing device, execution of the first application in the second container, and applying, by the mobile computing device, and based at least on the second policy, the second group of controls to the first application executing in the second container, wherein the second container defines the second domain in which the first application is executed.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processing units (e.g., processors) to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other storage medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processing units (e.g., processors), such as one or more digital signal processors (DSPs), general purpose microprocessors, application specific integrated circuits (ASICs), field programmable logic arrays (FPGAs), or other equivalent integrated or discrete logic circuitry. Accordingly, the term "processing unit" or "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processing units as described above, in conjunction with suitable software and/or firmware.

It is to be recognized that, depending on the embodiment, certain acts or events of any of the methods described herein can be performed in a different sequence, may be added, merged, or left out altogether e.g., not all described acts or events are necessary for the practice of the method). Moreover, in certain embodiments, acts or events may be performed concurrently, e.g., through multi-threaded processing, interrupt processing, or multiple processing units, rather than sequentially.

In some examples, a computer-readable storage medium comprises a non-transitory medium. The term "non-transitory" indicates that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

What is claimed is:

1. A method comprising:
   selecting, by a mobile computing device comprising one or more processors, and based at least on a first policy of a group of policies, a first container in which to execute a first application, wherein the first container is included in a group of containers that are each configured to isolate at least one application during execution within the respective container;
   selecting, by the mobile computing device, and based at least on a second policy of the group of policies, a second container in which to execute a second application, wherein the second container is included in the group of containers, wherein the second container is different from the first container, wherein the second policy specifies a maximum number of applications that are executable in the second container, wherein the second policy is different from the first policy, and wherein the second application is different from the first application;
   responsive to determining that the maximum number of applications are selected for execution in the second container, selecting, by the mobile computing device, and based on the second policy, a third container in which to execute a third application, wherein the third container is different from the second container;
   isolating, by the mobile computing device, execution of the first application in the first container, execution of the second application in the second container, and execution of the third application in the third container;
   applying, by the mobile computing device, and based at least on the first policy, a first group of controls to the first application executing in the first container, wherein the first group of controls are at least configured to restrict access of the first application to a first group of resources provided by the mobile computing device, and to control communications with the first application, wherein the first container defines a first domain in which the first application is executed; and
   applying, by the mobile computing device, and based at least on the second policy, a second group of controls to the second application executing in the second container and to the third application executing in the third container, wherein the second group of controls are at least configured to restrict access of the second application and the third application to a second group of resources provided by the mobile computing device, and to control communications with the second application and the third application, wherein the second container defines a second domain in which the second application is executed, and wherein the third container also defines the second domain in which the third application is executed.

2. The method of claim 1, wherein the first policy of the group of policies comprises a first domain policy, and wherein the second policy of the group of policies comprises a second domain policy.

3. The method of claim 1, wherein selecting the first container comprises creating a first new container in the group of containers, and wherein selecting the second container comprises creating a second new container in the group of containers.

4. The method of claim 1,
   wherein the group of containers comprises a group of pre-created containers provided by the mobile computing device,
   wherein selecting the first container comprises selecting a first pre-created container from the group of pre-created containers, and
   wherein selecting the second container comprises selecting a second pre-created container from the group of pre-created containers.

5. The method of claim 1, wherein the second group of resources shares at least one common resource with the first group of resources.

6. The method of claim 1, wherein applying the first group of controls to the first application executing in the first container to control communications with the first communication comprises providing a secure communication mechanism between the first application executing in the first container and another application executing in the first container.

7. The method of claim 1, wherein applying the first group of controls to the first application executing in the first container to control communications with the first communication comprises providing a secure communication mechanism between the first application executing in the first container and the second application executing in the second container.

8. The method of claim 1, wherein the first group of controls of the first policy further includes one or more of configuration controls to control configuration of the first container, storage controls to control storage of data within the first container, or application security controls for the first container.

9. The method of claim 1,
wherein the first group of controls are further configured to provide, in the first container, a first independent storage area to store data that is only accessible to the first application, and
wherein the second group of controls are further configured to provide, in the second container, a second independent storage area to store data that is only accessible to the second application.

10. The method of claim 1, further comprising:
selecting, by the mobile computing device and based at least on the first policy, the first container in which to execute a fourth application;
isolating, by the mobile computing device, execution of the fourth application in the first container; and
applying, by the mobile computing device, and based at least on the first policy, the first group of controls to the fourth application executing in the first container, wherein the first container defines the first domain in which the fourth application is executed.

11. The method of claim 1, further comprising:
selecting, by the mobile computing device, and based upon a domain change request, the second container in which to execute the first application;
isolating, by the mobile computing device, execution of the first application in the second container; and
applying, by the mobile computing device, and based at least on the second policy, the second group of controls to the first application executing in the second container, wherein the second container defines the second domain in which the first application is executed.

12. The method of claim 1, wherein the first container comprises a first operating system level virtualization (OSLV) container, and wherein the second container comprises a second OSLV container.

13. A computer-readable storage device storing instructions that, when executed, cause a mobile computing device comprising one or more processors to perform operations comprising:
selecting, based at least on a first policy of a group of policies, a first container in which to execute a first application, wherein the first container is included in a group of containers that are each configured to isolate at least one application during execution within the respective container;
selecting, based at least on a second policy of the group of policies, a second container in which to execute a second application, wherein the second container is included in the group of containers, wherein the second container is different from the first container, wherein the second policy specifies a maximum number of applications that are executable in the second container, wherein the second policy is different from the first policy, and wherein the second application is different from the first application;
responsive to determining that the maximum number of applications are selected for execution in the second container, selecting, by the mobile computing device, and based on the second policy, a third container in which to execute a third application, wherein the third container is different from the second container;
isolating, by the mobile computing device, execution of the first application in the first container, execution of the second application in the second container, and execution of the third application in the third container;
applying, based at least on the first policy, a first group of controls to the first application executing in the first container, wherein the first group of controls are at least configured to restrict access of the first application to a first group of resources provided by the mobile computing device, and to control communications with the first application, wherein the first container defines a first domain in which the first application is executed; and
applying, by the mobile computing device, and based at least on the second policy, a second group of controls to the second application executing in the second container and to the third application executing in the third container, wherein the second group of controls are at least configured to restrict access of the second application and the third application to a second group of resources provided by the mobile computing device, and to control communications with the second application and the third application, wherein the second container defines a second domain in which the second application is executed, and wherein the third container also defines the second domain in which the third application is executed.

14. The computer-readable storage device of claim 13, wherein the second group of resources shares at least one common resource with the first group of resources.

15. The computer-readable storage device of claim 13, wherein applying the first group of controls to the first application executing in the first container to control communications with the first communication comprises providing a secure communication mechanism between the first application executing in the first container and another application executing in the first container.

16. The computer-readable storage device of claim 13, wherein applying the first group of controls to the first application executing in the first container to control communications with the first communication comprises providing a secure communication mechanism between the first application executing in the first container and the second application executing in the second container.

17. The computer-readable storage device of claim 13,
wherein the first group of controls are further configured to provide, in the first container, a first independent storage area to store data that is only accessible to the first application, and
wherein the second group of controls are further configured to provide, in the second container, a second independent storage area to store data that is only accessible to the second application.

18. The computer-readable storage device of claim 13, wherein the operations further comprise:
selecting, based at least on the first policy, the first container in which to execute a fourth application;
isolating execution of the fourth application in the first container; and
applying, based at least on the first policy, the first group of controls to the fourth application executing in the first container, wherein the first container defines the first domain in which the fourth application is executed.

19. The computer-readable storage device of claim 13, wherein the operations further comprise:
selecting, based upon a domain change request, the second container in which to execute the first application;
isolating execution of the first application in the second container; and applying, based at least on the second policy, the second group of controls to the first application executing in the second container, wherein the second container defines the second domain in which the first application is executed.

20. A mobile computing device, comprising:
one or more processors; and
a computer-readable storage device communicatively coupled to the one or more processors, wherein the computer-readable storage device stores instructions that, when executed by the one or more processors, cause the one or more processors to:
select, based at least on a first policy of a group of policies, a first container in which to execute a first application, wherein the first container is included in a group of containers that are each configured to isolate at least one application during execution within the respective container, and wherein the first policy specifies the number of applications that are executable in the first container;
select, based at least on a second policy of the group of policies, a second container in which to execute a second application, wherein the second container is included in the group of containers, wherein the second container is different from the first container, wherein the second policy specifies a maximum number of applications that are executable in the second container, wherein the second policy is different from the first policy, and wherein the second application is different from the first application;
responsive to determining that the maximum number of applications are selected for execution in the second container, select, based on the second policy, a third container in which to execute a third application, wherein the third container is different from the second container;
isolate execution of the first application in the first container, execution of the second application in the second container, and execution of the third application in the third container;
apply, based at least on the first policy, a first group of controls to the first application executing in the first container, wherein the first group of controls are at least configured to restrict access of the first application to a first group of resources provided by the mobile computing device, and to control communications with the first application, wherein the first container defines a first domain in which the first application is executed; and
apply, based at least on the second policy, a second group of controls to the second application executing in the second container and to the third application executing in the third container, wherein the second group of controls are at least configured to restrict access of the second application and the third application to a second group of resources provided by the mobile computing device, and to control communications with the second application and the third application, wherein the second container defines a second domain in which the second application is executed, and wherein the third container also defines the second domain in which the third application is executed.

21. The mobile computing device of claim 20, wherein the second group of resources shares at least one common resource with the first group of resources.

22. The mobile computing device of claim 20, wherein the instructions that cause the one or more processors to apply the first group of controls to the first application executing in the first container to control communications with the first communication comprise instructions that cause the one or more processors to provide a secure communication mechanism between the first application executing in the first container and another application executing in the first container.

23. The mobile computing device of claim 20, wherein the instructions that cause the one or more processors to apply the first group of controls to the first application executing in the first container to control communications with the first communication comprise instructions that cause the one or more processors to provide a secure communication mechanism between the first application executing in the first container and the second application executing in the second container.

24. The mobile computing device of claim 20,
wherein the first group of controls are further configured to provide, in the first container, a first independent storage area to store data that is only accessible to the first application, and
wherein the second group of controls are further configured to provide, in the second container, a second independent storage area to store data that is only accessible to the second application.

25. The mobile computing device of claim 20, wherein the instructions further cause the one or more processors to:
select, based at least on the first policy, the first container in which to execute a fourth application;
isolate execution of the fourth application in the first container; and
apply, based at least on the first policy, the first group of controls to the fourth application executing in the first container, wherein the first container defines the first domain in which the fourth application is executed.

26. The mobile computing device of claim 20, wherein the instructions further cause the one or more processors to:
select, based upon a domain change request, the second container in which to execute the first application;
isolate execution of the first application in the second container; and
apply, based at least on the second policy, the second group of controls to the first application executing in the second container, wherein the second container defines the second domain in which the first application is executed.

* * * * *